(12) United States Patent
Ashok et al.

(10) Patent No.: US 8,495,356 B2
(45) Date of Patent: Jul. 23, 2013

(54) SYSTEM FOR SECURING VIRTUAL MACHINE DISKS ON A REMOTE SHARED STORAGE SUBSYSTEM

(75) Inventors: Rohith Ashok, Apex, NC (US);
Matthew R. Hogstrom, Cary, NC (US);
Ian N. Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 12/983,053

(22) Filed: Dec. 31, 2010

(65) Prior Publication Data

US 2012/0173866 A1 Jul. 5, 2012

(51) Int. Cl.
*H04L 29/06* (2006.01)
*G06F 9/445* (2006.01)
*G06F 9/455* (2006.01)

(52) U.S. Cl.
USPC .............................. 713/150; 717/174; 718/1

(58) Field of Classification Search
USPC .............................. 713/150; 717/174; 718/1
See application file for complete search history.

(56) References Cited

U.S. PATENT DOCUMENTS

| | | | | |
|---|---|---|---|---|
| 2005/0138414 A1* | 6/2005 | Zimmer et al. | | 713/201 |
| 2006/0026693 A1* | 2/2006 | Bade et al. | | 726/34 |
| 2007/0079112 A1* | 4/2007 | Lewis et al. | | 713/2 |
| 2009/0300719 A1* | 12/2009 | Ferris | | 726/3 |
| 2010/0027552 A1* | 2/2010 | Hill | | 370/401 |
| 2010/0169948 A1* | 7/2010 | Budko et al. | | 726/1 |
| 2011/0061046 A1* | 3/2011 | Phillips | | 717/176 |
| 2011/0075674 A1* | 3/2011 | Li et al. | | 370/401 |
| 2011/0131335 A1* | 6/2011 | Spaltro et al. | | 709/228 |
| 2011/0202916 A1* | 8/2011 | VoBa et al. | | 718/1 |
| 2011/0293097 A1* | 12/2011 | Maino et al. | | 380/279 |
| 2011/0296201 A1* | 12/2011 | Monclus et al. | | 713/190 |
| 2011/0302400 A1* | 12/2011 | Maino et al. | | 713/2 |
| 2012/0054486 A1* | 3/2012 | Lakkavalli et al. | | 713/156 |

* cited by examiner

*Primary Examiner* — Techane Gergiso
(74) *Attorney, Agent, or Firm* — Steven Greenberg, Esq.; Carey, Rodriguez, Greenberg & O'Keefe

(57) ABSTRACT

Embodiments of the present invention provide a method, data processing system and computer program product for secure distribution of virtualized storage. In an embodiment of the invention, a method for secure distribution of virtualized storage in a host in a cloud computing can include composing at least one virtual machine (VM) disk in a secure container and configured to deploy VM images into a cloud computing environment, encrypting the composed at least one VM disk, transmitting the encrypted VM disk to a hypervisor in the cloud computing environment receiving a request to activate a VM instance and generating a bootloader in the secure container, transmitting the bootloader to the hypervisor in the cloud computing environment and providing a key to the bootloader to unlock the at least one VM disk.

6 Claims, 1 Drawing Sheet

SYSTEM FOR SECURING VIRTUAL MACHINE DISKS ON A REMOTE SHARED STORAGE SUBSYSTEM

BACKGROUND OF THE INVENTION

1. Field of the Invention

The present invention relates to cloud computing and more particularly to secure distribution of virtualized storage in a cloud computing environment.

2. Description of the Related Art

Cloud computing is a model of service delivery for enabling convenient, on-demand network access to a shared pool of configurable computing resources including computer communications networks, network bandwidth, servers, processing, memory, storage, applications, virtual machines, and services, that can be rapidly provisioned and released with minimal management effort or interaction with a provider of the service. This cloud model may include at least five characteristics, at least three service models, and at least four deployment models. Characteristics of cloud computing include on-demand self-service, broad network access, resource pooling, rapid elasticity, and measured service.

Cloud computing enables several different service models such as the Software as a Service (SaaS) model, the Platform as a Service (PaaS) model, and the Infrastructure as a Service (IaaS) model. Cloud computing itself can be deployed according to a number of deployment models including the private cloud model in which the cloud infrastructure is operated solely for an organization, the community cloud model in which the cloud infrastructure is shared by several organizations and supports a specific community that has shared concerns, the public cloud model in which the cloud infrastructure is made available to the general public or a large industry group and is owned by an organization selling cloud services, and the hybrid cloud model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure of a network of interconnected nodes. In this regard, a typical cloud computing environment includes one or more cloud computing nodes with which local computing devices used by cloud consumers may communicate. The nodes communicate with one another and can be grouped together physically or virtually, in one or more networks, such as private, community, public, or hybrid clouds as described hereinabove, or a combination thereof. As such, the cloud computing environment can offer infrastructure, platforms and software as services for which a cloud consumer does not need to maintain resources on a local computing device. As technology evolves, the infrastructure, platforms and software as services is expected to evolve as well.

A cloud represents an excellent way to run machines in a more optimal way; however, a cloud also presents some risks. One risk is the fact that the cloud storage provided is shared storage. In this sense, the cloud storage is not managed by the owner of the virtual machines but instead the cloud storage is managed by a cloud administrator. One concern of the virtual machine owner is that the disks which run on the storage are not secure from tampering by third parties. Consequently, these disks can be copied and dissected without the virtual machine owner's knowledge. As a result, any data contained with the virtual machine is liable to tampering and data loss.

BRIEF SUMMARY OF THE INVENTION

Embodiments of the present invention address deficiencies of the art in respect to secure distribution of virtualized storage in a cloud computing environment and provide a novel and non-obvious method, system and computer program product for secure distribution of virtualized storage. In an embodiment of the invention, a method for secure distribution of virtualized storage in a host in a cloud computing can include composing at least one virtual machine (VM) disk in a secure container configured to deploy VM images into a cloud computing environment and encrypting the composed VM disk. The method further can include transmitting the encrypted at least one VM disk to a hypervisor in the cloud computing environment. The method further can receive a request to activate a VM instance and generate a bootloader in the secure container. Finally the method can include transmitting the bootloader to the hypervisor in the cloud computing environment and providing a key to the bootloader to unlock the at least one VM disk.

In one aspect of the embodiment, the method can include establishing a secure communicative link between the secure container and the hypervisor and transmitting the encrypted VM disk to the hypervisor in the cloud computing environment over the communicative link. In another aspect of the embodiment, the communicative link can be a secure sockets layer (SSL) communication layer link between the secure container and the hypervisor. The method further can include verifying the bootloader in the appliance with an identifier received from the bootloader and responsive to verifying the bootloader, providing a key to unlock the at least one VM disk to the bootloader.

In another embodiment of the invention, a cloud computing data processing system can be provided. The system can include a secure container executing on a hardware appliance with at least one processor and memory and configured for communicative coupling to different hypervisors, each supporting VM storage in a cloud computing environment. The system further can include a data store of VM images for storage in at least one of the different hypervisors. Finally, the system can include a secure distribution module executing in the memory of the secure container of a hardware appliance. The module can include program code enabled upon execution in the hardware appliance to compose a virtual machine (VM) disk in a hardware appliance, which is configured to at least one machine (VM) disk in a secure container, which is configured to deploy VM images into the cloud computing environment, to encrypt the composed at least one VM disk, to transmit the at least one encrypted VM disk to a hypervisor in the cloud computing environment, to receive a request to activate a VM instance and generate a bootloader in the secure container, to transmit the bootloader to the hypervisor in the cloud computing environment and to provide a key to the bootloader to unlock the at least one VM disk.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, data processing system and computer program product for secure distribution of virtualized storage. In an embodiment of the invention, a method for secure distribution of virtualized storage in a host in a cloud computing can include composing at least one virtual machine (VM) disk in a secure container in a cloud computing environment and configured to deploy VM images into the cloud computing environment. The method further can include encrypting the composed at least one VM disk and transmitting the encrypted at least one VM disk to a hypervisor in the cloud computing environment. The method yet further can include receiving a request to activate a VM instance and generating a bootloader in the secure container. Finally the method can include transmitting the bootloader to the hypervisor in the cloud computing environment and providing a key to the bootloader to unlock the at least one VM disk.

Figure 1:
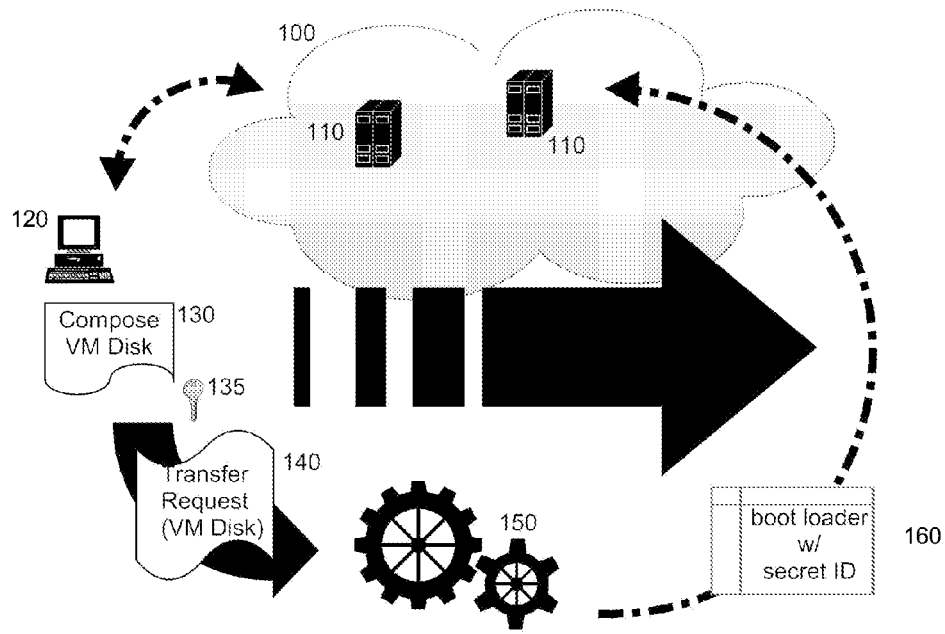
FIG. 1 is a pictorial illustration of a process for secure distribution of virtualized storage.

In further illustration, FIG. 1 is a pictorial illustration of a process for mobility aware cloud provisioning. As shown in FIG. 1, a secure container 120 communicatively coupled to a cloud computing environment 100 can compose a virtual machine (VM) disk 130 and encrypt the VM disk 130 with an encryption key 135 for transmission to storage on a hypervisor 110 located in cloud computing environment 100. In embodiments, the secure container can be a secure hardware appliance which can be located within the cloud computing environment 100 or outside of the cloud computing environment 100. Secure distribution logic 150 can process a transfer request 140 for transfer of the encrypted VM disk 130 to storage on a hypervisor 110 in the cloud computing environment 100. Secure distribution logic 150 can generate a bootloader 160 with a secret identifier, e.g., a security token, secret name, number, key or the like, and transmit the encrypted VM disk to the hypervisor 110 in the cloud computing environment 100. In addition, secure distribution logic 150 can transmit the generated bootloader 160 to the hypervisor 110 in the cloud computing environment 100. When a request to activate a VM instance enters the system, the bootloader 160, associated with that particular encrypted VM disk 130, will activate and commence communication solely with the secure container 120. The bootloader 160 requests the key to unlock the VM disks 130 and verifies its identity with the secret identifier, e.g., a security token, only known to that particular bootloader 160.

Using the secret identifier, the secure distribution logic 150 verifies the bootloader and provides a key. After the virtual machine (VM) is instantiated, the bootloader 180 is destroyed and any subsequent start of a VM instance results in the transmission of a new bootloader 180. Alternatively, when the proper secret identifier can not be verified by the secure distribution module 150, the VM disk 130 will remained locked and access will be denied.

Figure 2:
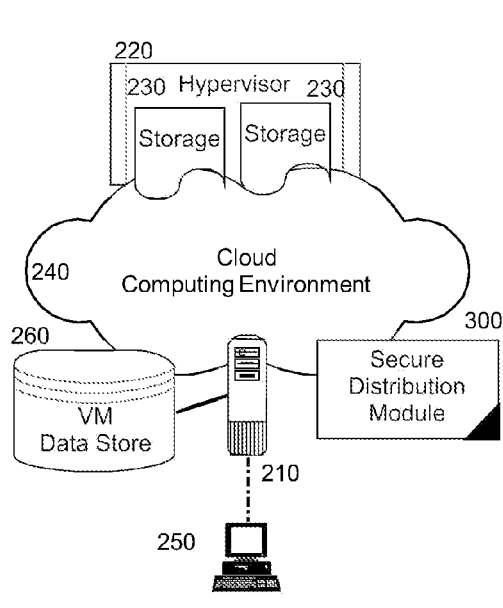
FIG. 2 is a schematic illustration of a cloud computing data processing system configured for secure distribution of virtualized storage; and, FIG. 3 is a flow chart illustrating a process for secure distribution of virtualized storage.

The process described in connection with FIG. 1 can be implemented in a cloud computing data processing system. In further illustration, FIG. 2 schematically shows of a cloud computing data processing system configured for secure distribution of virtualized storage. The system includes a secure container 210 which can be a secure hardware appliance with at least one processor and memory. The secure container 210 can be coupled to different hypervisors 220, each supporting VM storage 230 in a cloud computing environment 240. Of note, a secure distribution module 300 can execute in the memory of the secure container 210 by at least one processor of the secure container 210. In embodiments, the secure container can be a software engine configured to execute in the memory of a general computer by at least one processor of the general computer.

The secure distribution module 300 can include program code enabled upon execution in the memory of the secure container 210 to compose a virtual machine (VM) disk in the secure container 210 and to deploy VM images in the cloud computing environment. Additionally, the program code of the secure distribution module 300 can encrypt the composed VM disk. The program code of the secure distribution module 300 can transmit the encrypted VM disk to a hypervisor in the cloud computing environment. The program code of the secure distribution module 300 can receive a request to activate an instance of a VM. In response to the request to instantiate the VM, the secure container 210 can generate a bootloader, which has a secret identifier, e.g., a security token. The bootloader can send a request to the secure container 210 for a key to unlock the VM disks 230. Finally, the program code of the secure distribution module 300 can respond to the request by providing a key to the bootloader to unlock the VM disks 230 after verifying the secret identifier.

Figure 3:
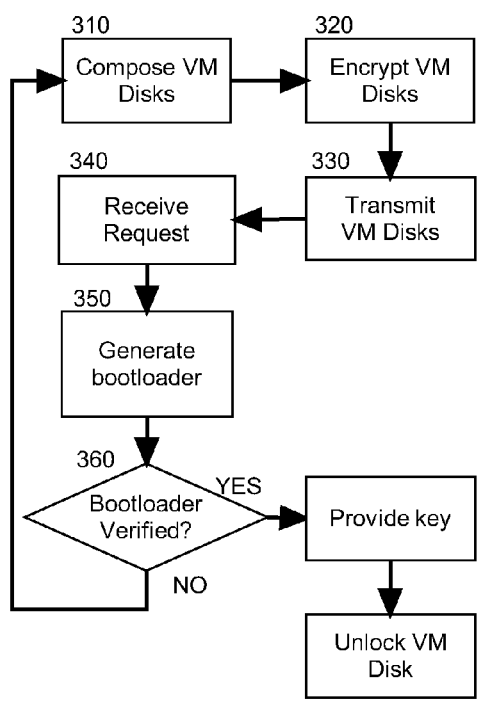

In even yet further illustration of the operation of the secure distribution module 300, FIG. 3 is a flow chart illustrating a process for secure distribution of virtualized storage in a cloud computing environment. Beginning in block 310, a virtual machine (VM) disk can be composed in a secure container, e.g., a secure hardware appliance, and configured to deploy VM images into the cloud computing environment. In block 320, the composed VM disks can be encrypted and in block 330, the composed VM disk can be transmitted to a hypervisor in cloud computing environment. In block 340, the system can receive a request to instantiate a virtual machine (VM). Thereafter, in block 350, a bootloader can be generated as a result of the request to instantiate the VM and the bootloader can communicate back to the secure container 210 and request a key to unlock or decrypt the VM disks 230. In decision block 360, a verification of the bootloader is conducted and if the bootloader is verified then the secure container provides the decrypt key to the bootloader in block 370 and in block 380 the stored VM disk is unlocked, such as when the stored VM images are downloaded. However, if the bootloader is not verified, then no activation of the VM images will occur.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A cloud computing data processing system comprising:
   a hardware appliance having a secure container configured for communicative coupling to different hypervisors, each of the different hypervisors supporting virtual machine (VM) storage in a cloud computing environment;
   a data store of VM images for storage in at least one of the different hypervisors; and,
   a secure distribution module executing in the memory of the hardware appliance, the module comprising program code enabled upon execution in the hardware appliance to compose at least one VM disk in a secure container, which is configured to deploy VM images into the cloud computing environment, to encrypt the composed at least one VM disk, to transmit the at least one encrypted VM disk to a hypervisor in the cloud computing environment, to generate a bootloader associated with the encrypted VM disk in the secure container, to generate a security token for the bootloader, to transmit the bootloader to the hypervisor in the cloud computing environment, to receive a request to activate a VM instance, to request a key by the bootloader, to verify the bootloader using the security token, and to provide the key to the bootloader to unlock the at least one VM disk upon verification of the bootloader.

2. The system of claim 1, wherein the program code of the module transmits the encrypted VM disk to a hypervisor in the cloud computing environment by establishing a secure communicative link between the secure container and the hypervisor, and by transmitting the encrypted VM disk to the hypervisor in the cloud computing environment over the secure communicative link.

3. The system of claim 1, wherein the program code of the module establishes a secure communicative link between the secure container and the hypervisor by establishing a secure sockets layer (SSL) communication layer link between the secure container and the hypervisor and by transmitting the encrypted VM disk to the hypervisor in the cloud computing environment over the SSL communication layer link.

4. A computer program product for secure distribution of virtualized storage in a cloud computing environment, the computer program product comprising:
   a computer readable storage device having stored therein computer readable program code, the computer readable program code comprising:
   computer readable program code for composing at least one virtual machine (VM) disk in a secure container and configured to deploy VM images into a cloud computing environment;
   computer readable program code for encrypting the composed VM disk;
   computer readable program code for transmitting the encrypted VM disk to a hypervisor in the cloud computing environment;
   computer readable program code for generating a bootloader associated with the encrypted VM disk in the secure container;
   computer readable program code for generating a security token for the bootloader;
   computer readable program code for transmitting the bootloader to the hypervisor in the cloud computing environment;
   computer readable program code for receiving a request to activate a VM instance;
   computer readable program code for requesting a key by the bootloader;
   computer readable program code for verifying the bootloader using the security token; and
   computer readable program code for providing the key to the bootloader to unlock the at least one VM disk upon verification of the bootloader.

5. The computer program product of claim 4, wherein the computer readable program code for transmitting the encrypted VM disk to a hypervisor in the cloud computing environment, comprises:
   computer readable program code for establishing a secure communicative link between the secure container and the hypervisor; and,
   computer readable program code for transmitting the encrypted VM disk to the hypervisor in the cloud computing environment by the secure communicative link.

6. The computer program product of claim 4, wherein the computer readable program code for establishing a secure communicative link between the secure container and the hypervisor, comprises computer readable program code for establishing a secure sockets layer (SSL) communication layer link between the secure container and the hypervisor, and, by transmitting the encrypted VM disk to the hypervisor in the cloud computing environment over the SSL communication layer link.

* * * * *